United States Patent [19]
Wambach

[11] 3,915,926
[45] *Oct. 28, 1975

[54] FLAME RETARDANT THERMOPLASTIC COMPOSITIONS

[75] Inventor: Allen D. Wambach, Pittsfield, Mass.

[73] Assignee: General Electric Company, Pittsfield, Mass.

[ * ] Notice: The portion of the term of this patent subsequent to Sept. 3, 1991, has been disclaimed.

[22] Filed: July 23, 1974

[21] Appl. No.: 490,937

Related U.S. Application Data

[63] Continuation-in-part of Ser. No. 233,754, March 10, 1972, Pat. No. 3,833,685.

[52] U.S. Cl. ... 260/40 R; 260/45.75 B; 260/860 M; 260/DIG. 24; 252/8.1
[51] Int. Cl.² .......................................... C08L 67/00
[58] Field of Search ........................... 260/860, 40 R

[56] References Cited
UNITED STATES PATENTS

| | | | |
|---|---|---|---|
| 3,334,154 | 8/1967 | Kim | 260/860 |
| 3,406,224 | 10/1968 | McDonough | 260/860 |
| 3,454,672 | 7/1969 | Jackson et al. | 260/860 |
| 3,833,685 | 9/1974 | Wambach | 260/860 |

FOREIGN PATENTS OR APPLICATIONS 1,241,543   8/1971   United Kingdom

*Primary Examiner*—Paul Lieberman
*Attorney, Agent, or Firm*—William F. Mufatti; George B. Finnegan, Jr.; Edward A. Hedman

[57] ABSTRACT

Normally flammable polyester resins (a) are rendered flame-retardant without loss in toughness by combination with (b) a flame retardant amount of (i) an aromatic carbonate copolymer, from 25 to 75 wt. percent of the repeating units comprising chloro- or bromo-substituted dihydric phenol units; (ii) an aromatic carbonate homopolymer having repeating units comprising chloro- or bromo-substituted dihydric phenol units in combination with an aromatic carbonate homopolymer having repeating dihydric phenol units; or (iii) a combination of (i) with an aromatic carbonate homopolymer having repeating dihydric phenol units, (c) an antimony-containing compound and (d) a reinforcing filler.

20 Claims, No Drawings

FLAME RETARDANT THERMOPLASTIC COMPOSITIONS

CROSS-REFERENCE TO RELATED APPLICATION

This application is a continuation-in-part of Ser. No. 233,754, filed 3/10/72 now U.S. Pat. No. 3,833,685.

This invention relates to new and novel flame retardant thermoplastic compositions. More particularly, it is concerned with tough, flame retardant high molecular weight polyesters in combination with flame retardant amounts of aromatic carbonate homopolymers and copolymers, said aromatic carbonates containing at least some chloro- or bromo-substituted dihydric phenol units.

BACKGROUND OF THE INVENTION

The use of high molecular weight polyesters in thermoplastic molding compositions is well known to those skilled in the art. Such polyesters provide compositions with excellent moldability, and molded articles therefrom having smooth and glossy surface appearance, high strength, stiffness, temperature resistance and other desirable properties.

However, a major short-coming in the use of such polyesters in molding compositions is their normally highly flammable nature. The flammability of polyesters has been reduced by using halogen-, phosphorus- or nitrogen-containing additives, and such compositions are described in various patents and publications. Flame retarded thermoplastic polyester compositions are desired for many fields of use such as in home construction, automobile and aircraft manufacture, packaging, electrical equipment and the like.

With particular reference to polyesters of the poly-(alkylene dicarboxylate) family related copolyesters, it has been difficult to adequately render such materials flame retardant without sacrificing their inherent, superior toughness properties. Specifically, the use of conventional flame retardant additives, in conventional amounts, causes marked decreases in the parameters oridinarily used to measure toughness: eg., elongation on break, notched Izod impact strength, Gardner ductile impact resistance and the like.

It has now been discovered that if carefully selected families of polycarbonate resins are added to the normally flammable polyesters, alone or in further combination with selected groups of other such polycarbonate resins, there will be provided highly efficiently flame retardant polyester compositions, without any need for reinforcement, yet without substantial loss in toughness. Furthermore, such compositions are provided without sacrificing the other desirable traits, besides toughness, of the polyester resin molding compositions of the prior art.

By way of illustration, the addition of a compatible aromatic pooycarbonate additive or additives of the type to be described hereinafter, provides compositions which are flame retardant to the point where they meet stringent Underwriter's Laboratory requirements for self-extinguishing compositions, but which at the same time have markedly improved elongation, Izod impact and ductile impact strength with comparison with specimens rendered flame retardant by prior art procedures.

Moreover, the direct combustibilities of such compositions, as measured in the Oxygen Index Test according to ASTM standard method D-2863, are less than those of controls rendered flame retardant by prior art methods.

It is, accordingly, a principal object of this invention to provide a family of tough, flame retardant polyester compositions.

It is another object of this invention to provide flame retardant polyester compositions with excellent moldability, and which, after molding, provide work pieces with smooth and glossy surface, high strength, stiffness and temperature resistance, and, especially, enhanced elongation, Izod impact strength and ductile impact strength.

Other objects and advantages of the invention will become apparent from the following detailed description.

DESCRIPTION OF THE INVENTION

According to this invention there are provided flame retardant thermoplastic compositions comprising a. a normally flammable high molecular weight polyester; and a flame retardant amount of b. i. an aromatic carbonate copolymer in which from 25 to 75 wt. percent of the repeating units comprise chloro- or bromo-substituted dihydric phenol units and the remainder of the repeating units comprise dihydric phenol, glycol or dicarboxylic acid units;

ii. an aromatic carbonate homopolymer in which the repeating units comprise chloro- or bromo-substituted dihydric phenol units in combination with an aromatic carbonate homopolymer comprising dihydric phenol units; or iii. a combination of (i) with an aromatic carbonate homopolymer comprising dihydric phenol units, in combination with c. a synergist, e.g., an inorganic or organic antimonycontaining compound; and d. a reinforcing amount of a reinforcing filler.

The term "normally flammable high molecular weight polyester" includes, in general, linear saturated condensation products of diols and dicarboxylic acids, or reactive derivatives thereof. Preferably, they will comprise condensation products of aromatic dicarboxylic acids and aliphatic idols. It is to be understood, that it is also possible to use polyesters such as poly(1,4-dimethylol cyclohexane dicarboxylates, e.g., terephthalates). In addition to phthalates, small amounts of other aromatic dicarboxylic acids, such as naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols. In any event, the preferred polyesters are well known as film and fiber formers, and they are provided by methods outlined in Whinfield, U.S. Pat. No. 2,465,319 and Pengilly, U.S. Pat. No. 3,047,539 and elsewhere. The preferred polyesters will comprise a poly(alkylene terephthalate, isophthalate or mixed isophthalateterephthalate, e.g., up to 30 mole percent isophthalate), said alkylene groups containing from 2 to 10 carbon atoms, e.g., poly(ethylene terephthalate) or poly(1,4-butylene teraphthalate). Because of its rapid crystallization from the melt, it is preferred to use poly-(1,4-butylene terephthalate) as the normally flammable polyester resin component of the present compositions.

The molecular weight of the polyester component should be sufficiently high to provide an intrinsic viscosity of about 0.6 to 2.0 deciliters per gram, preferably 0.7 to 1.6 dl./g., measured for example, as a 1 percent solution in a 60:40 mixture of phenol and tetrachloroethane at 25°C.

As has been mentioned, there will be used in the flame retardant compositions of this invention, the halogen-containing aromatic polycarbonate in combination with a synergist, such as phosphorus compounds, but particularly with inorganic and organic antimony compounds. Such compounds are widely available or can be made in known ways. In preferrd embodiments, the type of antimony compound used is not critical, being a choice primarily based on economics. For example, as inorganic antimony compounds there can be used antimony oxide, ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids, and the like. Illustrative of the organic antimony compounds, including inorganic salts of such compounds are: KSb tartrate; Sb caproate; $Sb(OCH_2CH_3)_3$; $Sb(OCH(CH_3)CH_2CH_3)_3$; Sb polymethylene glycolate; triphenyl antimony; and the like. Especially preferred is antimony oxide.

In one embodiment of this invention the compositions will include a flame retardant amount of an aromatic carbonate copolymer in which from 25 to 75 wt. percent of the repeating units comprise chloro- or bromo-substituted dihydric phenol units and the remainder of the repeating units comprise dihydric phenol, glycol or dicarboxylic acid units. The aromatic carbonate copolymers can be prepared by any of the well known methods which, for example, include reacting such materials as tetrabromobisphenol-A [2,2-bis-(3,5-dibromo-4-hydroxyphenyl)propane], or tetrachlorobisphenol-A [2,2-bis(3,5-dichloro-4-hydroxyphenyl)propane], and another compound, such as a glycol, e.g., ethylene glycol or propylene glycol or a dicarboxylic acid, e.g., adipic acid or isophthalic acid, but preferably a dihydric phenol such as bisphenol-A [2,2-bis-(4-hydroxyphenyl)propane] with phosgene or a reactive derivative of phosgene. A detailed procedure for the preparation of preferred such copolymers will be set forth hereinafter.

In general, the carbonate copolymer modifier employed to provide the moldable flame-resistant polyester resin-containing compositions of the present invention will be a copolymer prepared by reacting 75–25 wt. percent and preferably 40–30 wt. percent of tetrabromobisphenol-A or tetrachlorobisphenol-A and correspondingly, 25–75 and preferably 60–70 wt. percent of another compound which may be either a dihydric phenol, a glycol or a dicarboxylic acid or mixtures thereof, said weights being based on the total weight of the copolymer. In addition, the aromatic carbonate copolymer should have an intrinsic viscosity of 0.2–0.7 deciliters/gram, as measured, for example, in p-dioxane at about 30°C. Typical examples of the other compounds which can be employed in place of the bisphenol-A component of the copolymer are other dihydric phenols such as hydroquinone, resorcinol, 2,2-bis-(4-hydroxyphenyl)pentane, 2,4'-dihydroxydiphenylmethane, 2,6-dihydroxynaphthalene, bis-(4-hydroxyphenyl)sulfone, 4,4'-dihydroxydiphenyl ether, etc.; or glycols, such as ethylene glycol, propylene glycol, tetramethylethylene glycol, etc.; and also dicarboxylic acids such as adipic acid, isophthalic acid, sebacic acid, etc.; as well as mixtures of any of the above. However, the preferred copolymer component for use in the practice of this invention is a copolymer of about 35 wt. percent of tetrabromobisphenol-A and 65 wt. percent of bisphenol-A, respectively.

Although such aromatic carbonate copolymer components can be used in combination with any of the known synergists, such as phosphorus compounds, it is preferred to use inorganic or organic antimony compounds, e.g., antimony oxide as mentioned above, and such combinations are preferred embodiments of this invention.

In another preferred embodiment of this invention, component (b) will comprise, in combination, an aromatic carbonate homopolymer in which the repeating units comprise units of the formula

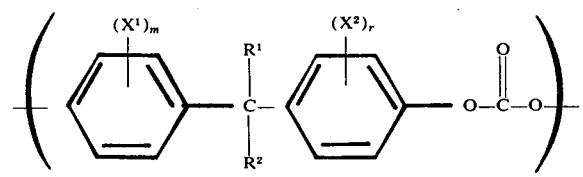

where $R^1$ and $R^2$ are hydrogen, (lower)alkyl or phenyl, $X^1$ and $X^2$ are bromo or chloro, and m and r are from 1 to 4, the average number of repeating units being from about 2 to about 20, the second component of the combination being an aromatic carbonate homopolymer comprising repeating units of the formula

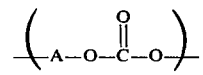

wherein A is a divalent aromatic radical of the dihydric phenol. Preferably, they will comprise repeating units of the formula

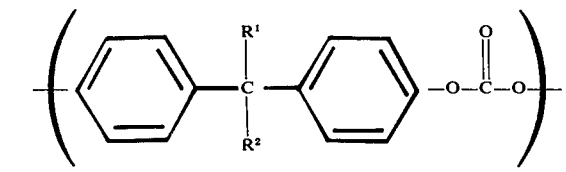

$R^1$ and $R^2$ being as above defined, the average number of repeating units being at least 100, and preferably from about 100 to about 400.

With respect to such homopolymer components having from about 2 to about 20 repeating units, the preferred compounds will be further characterized in having a low volatility when heated above 200°C.

This can be achieved by balancing the amount of halogen with the number of units in the chain, as is obvious to those skilled in the art. Such compounds can be prepared by reacting a carbonate precursor with a mixture of a halogenated dihydric phenol and a chain stopper. The carbonate precursor may be either a carbonyl halide or a haloformate. Among the carbonyl halides may be mentioned carbonyl bromide, carbonyl chloride (i.e., phosgene), carbonyl fluoride, and the like. Suitable haloformates will include the bischloroformate of tetrabromobisphenol-A or the chloroformate of tribromophenol (a chain stopper) all used together with phosgene, and the like. In all cases, phosgene is the preferred reactant for the dihydric phenols.

The halogenated dihydric phenols preferred for use in preparing the homopolymer of 2 to 20 units used in this invention may be of the formula

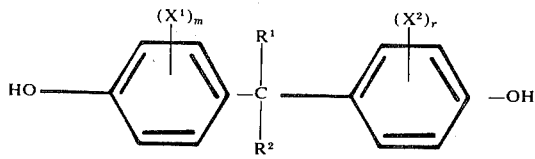

wherein $X^1$, $X^2$, $R^1$, $R^2$, m and r are as above defined. In all cases (lower)alkyl means straight and branched chain alkyl groups of from 1 to 6 carbon atoms. These dihydric phenols can be made in ways known to those skilled in the art, e.g., by the condensation of an unsubstituted or halogen substituted phenol and with the corresponding ketone, see, e.g., U.S. Pat. No. 2,468,982, then this is followed, if desired, by chlorination or bromination of the aromatic rings.

Illustrative of the dihydric phenols most useful in the preparation of the chain-stopped homopolymers of 2 to 20 units used in this invention are: 2,2-bis(3,5-dibromo-4-hydroxyphenyl)-propane (i.e., tetrabromobisphenol-A); 2,2-bis(3,5-dichloro-4-hydroxyphenyl)propane (i.e., tetrachlorobisphenol-A); bis(2-bromo-4-hydroxyphenyl)methane; bis(2,6-dibromo-4-hydroxyphenyl)methane; 1,2-bis(2,6-dibromo-4-hydroxyphenyl)ethane; 1,1-bis(2-bromo-6-chloro-4-hydroxyphenyl)ethane; 1,1-bis(3,5-dibromo-4-hydroxyphenyl)-ethane; 2,2-bis(2,6-dibromo-4-hydroxyphenyl)pentane; 3,3-bis(3,5-dibromo-4-hydroxyphenyl)hexane; bis(3,5-dibromo-4-hydroxyphenyl)-phenylmethane; bis(3,5-dibromo-4-hydroxyphenyl)cyclohexylmethane; 2,2-bis(4-hydroxy-2,3,5,6-tetrabromophenyl)propane; 2,2-bis(4-hydroxy-2,3,5,6-tetrachlorophenyl)propane; and the like. Especially suitable and preferred is the commercially available compound tetrabromobisphenol-A.

Those skilled in the art will realize that a wide variety of chain stopper compounds can be used in the preparation of the components of from 2 to 20 repeating units. In all cases, the chain-stopper will be monofunctional and reactive with the end groups of the repeating units. Usually the end groups will be reactive derivatives of a carbonate precursor, as defined above, so that any mono-functional compound capable of reacting with a carbonyl halide, a carbonate ester or a haloformate will suffice. Merely by way of illustration, there can be used organic monohydroxy compounds; as well as carboxylic acids or acid halides and many others. Particularly suitable are organic hydroxy compounds, such as alcohols, e.g., methanol, ethanol, decanol, and the like, and phenols. Particularly preferred as chain stopping compounds are organic phenols and especially preferred are chloro or bromo-substituted phenols. The latter chain stoppers give rise to chain stopped components for use in the present compositions which have terminal substituents of the formulae:

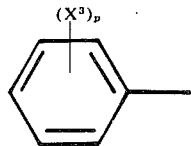

and

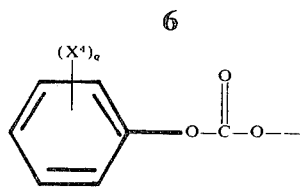

wherein $X^3$ and $X^4$ are bromo or chloro and p and q are each from 1 to 5. The respective phenols can be made in procedures well known to those skilled in the art. Illustrative of such phenols are 2-, 3-, 4-bromophenol and their chloro-analogs; 2,3-, 2,4-, 2,5-, 2,6-, 3,5- and 3,4-dibromophenol and their chloro-analogs; 2,3,5- and 2,4,6-tribromophenol and their chloro-analogs; 2,3,4,6- and 2,3,4,5-tetrabromophenol and their chloro-analogs; and 2,3,4,5,6-pentabromophenol and its chloro-analog. Chloro-bromo compounds can also be used. Especially suitable chain stopping compounds are the trihalogenated phenols and especially preferred is 2,4,6-tribromophenol.

The chain-stopped polymers of carbonates of halogenated dihydric phenols having an average of about 2 to 20 units in the chain are prepared by reacting a carbonate precursor with a mixture of the dihydric phenol and the chain stopper preferably in an inert solvent, and in the presence of an acid acceptor, until condensation is complete. It is necessary to use at least the stoichiometric amount of the carbonate precursor, and preferably an excess. Under such conditions, the ratio of the dihydric phenol to the monofunctional chain stopper will control the number of repeating dihydric phenol-carbonate units in the chain. If 2 moles of dihydric phenol and 2 moles of chain stopper are used, for example, the average number of repeating units, or n, as above defined, will be 2 and the product will have a relatively lower softening point. If, on the other hand, 10 or 20 moles of dihydric phenol and 2 moles of chain stopper are used, the average number of repeating units, n, will be about 10 or 20, as the case may be. It is preferred that the average number of repeating units, n, will be between 3 and 7 and especially preferred that they be of about 5. Accordingly, the molar ratio of dihydric phenol to chain stopper will preferably range from 3–7 to 2, and especially preferably, it will be about 5 to 2. If the product comprises a poly(tetrabromobisphenol-A carbonate), chain-stopped with 2,4,6-tribromophenol, such preferred ranges of repeating units will provide very useful softening points, e.g., from 230° to 260°C. and from 230° to 240°C., respectively. Such compounds will have a high bromine content, i.e., 56–59percent and an average molecular weight of about 3,000 to 3,500.

Used in combination with the homopolymer containing from 2 to 20 repeating units or, in another embodiment, with the aromatic carbonate copolymer, is an aromatic carbonate homopolymer having an average number of repeating units of at least about 100, e.g., from about 100 to about 400, or more. Certain of such polycarbonate resins are commercially available; all of them may be prepared by reacting a dihydric phenol free of halogen substitution with a carbonate precursor such as phosgene, a haloformate or a carbonate ester.

Generally speaking, the resulting carbonate polymers may be typified as possessing recurring structural units of the formula:

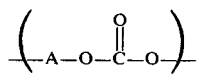

where A is a divalent aromatic radical of the dihydric phenol employed in the polymer producing reaction. Preferably, the polycarbonate homopolymer resins used with the halogen-containing aromatic carbonate homo- or co-polymers to provide the flame-resistant compositions of this invention will have intrinsic viscosities ranging from about 0.35 to about 0.75, as measured in p-dioxane at about 30°C. Broadly, the dihydric phenols which may be employed to provide such aromatic carbonate homopolymers are mononuclear or polynuclear aromatic compounds, containing as functional groups, two hydroxyl radicals, each of which is attached directly to a carbon atom of an aromatic nucleus. Typical dihydric phenols are 2,2-bis(4-hydroxyphenyl)propane; hydroquinone; resorcinol; 2,2-bis(4-hydroxyphenyl)pentane; 2,4'-dihydroxydiphenyl methane; bis (2-hydroxyphenyl)methane; bis(4-hydroxyphenyl)methane; bis(4-hydroxy-5-nitrophenyl)methane; 1,1-bis(4-hydroxyphenyl)- ethane; 3,3-bis(4-hydroxyphenyl)pentane; 2,2'-dihydroxydiphenyl; 2,6-dihydroxy naphthalene; bis(4-hydroxyphenyl)sulfone; 2,2'-dihydroxydiphenyl sulfone; 4,4'-dihydroxydiphenyl ether; and 4,4'- dihydroxy-2,5-diethoxydiphenyl ether. A variety of additional dihydric phenols free of halogen substitution which may be employed to provide such carbonate polymers are disclosed in Goldberg, U.S. Pat. No. 2,999,835. It is, of course, possible to employ two or more different dihydric phenols or, as stated above, a dihydric phenol in combination with a glycol, a hydroxy or acid-terminated polyester, or a dibasic acid in the event a carbonate copolymer rather than a homopolymer is desired for use in combination with the chain-stopped homopolymer in the preparation of the flame-resistant polyester compositions of this invention.

In one convenient manner of preparing the aromatic carbonate polymers of this invention, the dihydric phenol, alone, or mixed with a glycol or dicarboxylic acid or, if used, a chain stopping compound, at the preselected molar ratio, can be added to a well stirred solution of an amine, e.g., triethylamine or pyrridine, in a solvent, such as methylene chloride. Then phosgene gas is introduced into the reaction mixture until an excess is present. A suitable temperature is about 30° to 60 °C. and only a short reaction time, e.g., less than 1 hour is needed. The product is recovered, for example, by washing the reaction mixture with water, dilute acid and more water, then pouring the mixture into a large excess of a non-solvent for the polymer, e.g., methanol. The precipitated material can be recovered and dried by conventional methods. Another procedure is to carry out the reaction in a two phase aqueous organic solvent sytem, e.g., water-methylene chloride, in the presence of a base, such as an alkali metal hydroxide.

The amount of aromatic carbonate copolymer or homopolymer, or mixture thereof, used as a flame retardant component (b) is not critical to the invention, so long as it is present in a minor proportion based on said compositions — major proportions are uneconomical and may detract from the desired polyester-derived advantages, such as moldability, gloss, and the like. However, at least an amount sufficient to render the thermoplastic polyester resin flame retardant, non-burning or self-extinguishing will be used, as the case may be. Those skilled in the art are well aware that the amount of component (b) will vary with the nature of the flammable polyester resin and the relative efficiency of the additive and whether or not a synergist is also present. In general, however, the amount of additive will be from 0.5 to 50 parts by weight per 100 parts by weight of the resinous components, with the lesser amounts providing flame retardancy, and the higher amounts being used for self-extinguishing properties. A preferred range for those compositions based on the aromatic carbonate copolymer will be from about 15 to about 50 parts and an especially preferred range will be from about 20 to about 40 parts of additive per 100 parts of total resinous components in the composition. A preferred range for those compositions emphasizing the chain-stopped aromatic carbonate homopolymer in combination with the aromatic carbonate homopolymer with at least 100 repeating units is from about 15 to about 50 parts by weight (10 to 25 parts of "chain-stopped" and 5 to 25 parts of ">100 repeating units") and especially preferably 15 to 30 (10 to 15 parts of "chain-stopped" and 5 to 15 parts of ">100 repeating units") of the combination per 100 parts by weight of the total resinous components in the composition. With respect to the combination it is preferred that the aromatic carbonate homopolymer of from about 2 to about 20 repeating units comprise from 30 to 70 wt. percent and said aromatic carbonate homopolymer of at least about 100 repeating units comprise from 70 to 30 wt. percent of the combination, and, especially preferably, from 35 to 55 wt. percent and from 65 to 45 wt. percent, respectively. The amount of antimony compound can vary over a fairly wide range, but, in general, there is used from about 0.5 to about 20 parts by weight, expressed as antimony oxide, per 100 parts of combined resinous components in the composition, and preferably from about 1 to about 12 parts by weight of antimony oxide. In those embodiments using aromatic carbonate copolymers alone or in combination with an aromatic carbonate homopolymer, the amount of antimony compound will preferably range from 2 to 10 and especially preferably from 3 to 7 parts by weight, per 100 parts by weight of the resinous components in the composition. In the embodiments using chain-stopped aromatic carbonate homopolymers in combination with an aromatic carbonate having at least 100 repeating units, the amount of antimony compound will preferably range from about 2 to about 10 and especially preferably from about 3 to about 7 parts be weight, per 100 parts by weight of the resinous components in the composition. Corresponding molar equivalent amounts of the other antimony compounds can be used. In the combinations of antimony and the aromatic carbonate homopolymers and copolymers contemplated by the invention, the weight ratio in the combination can vary widely, but it is preferred to use from about 0.1 to 1.0 parts of antimony compound for each 1.0 part by weight of the total amount of halogenated carbonate in the composition.

It is also regarded to be among the features of this invention to include in the compositions, other ingredients, such as fillers, mold release agents, pigments, stabilizers, nucleating agents, and the like, in conventional amounts for their conventionally employed purposes.

The manner of adding the flame retardant additivies to the thermoplastic polyester resin is not critical; is conventional; and will be obvious to those skilled in the art. Preferably, however, each ingredient is added as part of a blend premix and the latter is mixed, e.g., by passage through an extruder, or by fluxing on a mill, at a temperature dependent on the needs of the particular compositions. The mixed composition can be cooled and cut up into molding granules and molded or extruded or formed into any desired shape. Typical processing and molding techniques will be illustrated hereinafter.

It is to be understood that the compositions of this invention can be used in many different ultimate shapes. For example, they may be molded into three-dimensional articles, or formed into films, or shaped into fibers, by conventional techniques.

PREPARATION OF COMPONENTS FOR THE PREFERRED EMBODIMENTS

The following procedures illustrate methods useful to prepare certain components used in the illustrative examples.

PROCEDURE A

35:65 Aromatic Carbonate Copolymer of Tetrabromobisphenol-A and Bisphenol-A.— Tetrabromobisphenol-A, 13.3 g., 0.024 moles, and 10.4 g. of bisphenol-A, 0.046 moles, are added to a well-stirred solution of 10.5 g. of pyridine, 0.13 moles, in enough methylene chloride to give 100 ml. of total solution volume. To the reaction vessel, fitted with a reflux condenser and a thermometer, 5.94 g. of phosgene gas, 0.06 moles, is added at the rate of 1.0 g. per minute through a dip tube below the surface of the solution. The temperature is allowed to rise to 39°C. and the methylene chloride refluxes. After addition of the phosgene is complete, stirring is maintained for about 15 minutes. The reaction solution is then washed with water, dilute HC1, and twice more with water to remove the pyridine, then poured into excess methanol, to precipitate the product. The product is filtered, washed with methanol and air-dried in an oven at 75 to 80°C.; intrinsic viscosity about 0.4 deciliters per gram, measured in dioxane at 30°C.

By the same procedure, substituting tetrachlorobisphenol-A for tetrabromobisphenol-A, there will be obtained the corresponding copolymer with 35 wt. percent of chloro-substituted dihydric phenol units. Obviously, variations in the ratios of dihydric phenol starting materials will provide pre-selected ratios of repeating units in the aromatic carbonate copolymer product.

PROCEDURE B

Aromatic Carbonate Homopolymer of Bisphenol-A — Procedure A is repeated, using instead of the mixture of tetrabromobisphenol-A and bisphenol-A, 16.0 g. of bisphenol-A, 0.07 moles, alone. After drying, the product has an intrinsic viscosity of about 0.6 deciliters per gram. The average number of repeating dihydric phenol units is above 100.

PROCEDURE C

Aromatic Carbonate Homopolymer of Tetrabromobisphenol-A Having About 5 Repeating Units — Procedure A is repeated, using 27.2, 0.05 moles, of tetrabromobisphenol-A and, instead of bisphenol-A, 6.62 g. of tribromophenol, 0.02 moles, as a chain-stopper. After drying there is obtained a percent yield of a low molecular weight brominated polycarbonate terminated with tribromophenoxy units, which softens at about 230°C., and contains 57.2 percent by weight of bromine. The average number of repeating units is about 5.

If methanol, phenol and 2,4,6-tribromophenol are substituted for the tribromophenol, there are obtained the corresponding polycarbonates terminated with methoxy, phenoxy and trichlorophenoxy groups. If tetrachlorobisphenol-A is substituted for tetrabromobisphenol-A, the corresponding homopolymer having about 5 repeating chloro-substituted dihydric phenol units per molecule is obtained. If the molar ratio of dihydric phenol to chain-stopper is changed from 5:2, respectively to 2:2, 10:2 and 20:2, the average number of repeating units in the product is, correspondingly, about 2, about 10 and about 20.

DESCRIPTION OF THE PREFERRED EMBODIMENTS

The following examples illustrate the preparation of certain compositions within the scope of this invention. They are not to be construed to limit the scope of the invention in any manner whatsoever.

EXAMPLE 1

In a 1 inch Wayne extruder operated at 470°F., are blended 65 parts by weight of poly(1,4-butylene terephthalate), intrinsic viscosity 1.03 dl./g., 30 parts by weight of a 35:65 aromatic carbonate copolymer of tetrabromobisphenol-A and bisphenol-A, intrinsic viscosity about 0.4 dl./g., and 5 parts by weight of antimony oxide. The blended composition is injection molded in a 3 oz. Van Dorn machine at 485°F. into test pieces which are subjected to physical and flame retardancy measurements. The test pieces are self-extinguishing within 5 seconds after two 10-second ignitions by an open flame, with no flaming dripping and a maximum of 10 seconds after-glowing (Rating SE-O, Underwriter's Bulletin 94 Flame Test, method described in Modern Plastics, October, 1970, p. 92–98). The Oxygen Index is 29.0 percent (ASTM D-2863). By ASTM D-1708, tensile strength is 8,830 psi. and elongation at break is 18 percent. The Izod impact strength is 0.7 ft.-lbs./in. (ASTM D-256 ) and the ductile impact strength is 350 inch-pounds by the Gardner falling dart method, sample ⅛ inch in thickness.

EXAMPLE 2

The procedure of Example 1 is repeated, the composition in this instance comprising 68 parts by weight of poly(1,4-butylene terephthalate), 26 parts by weight of the 35:65 aromatic carbonate copolymer of tetrabromobisphenol-A and bisphenol-A and 6 parts by weight of antimony oxide. The test pieces are self-extinguishing within 5 seconds after two 10-second ignitions by an open flame, with no flaming dripping and a maximum of 10 seconds after-glowing (SE-O). The Oxygen Index is 29.5 percent. The tensile strength is 8640 psi. and elongation to break is 23 percent. Notched Izod impact strength is 0.7 ft.-lbs./in. and the Gardner ductile impact strength is 350 in.-lbs.

EXAMPLE 3

The procedure of Example 1 is repeated, the composition in this instance comprising 70 parts by weight of Poly(1,4-butylene terephthalate), 26 parts by weight of the 35:65 aromatic carbonate copolymer of tetrabromobisphenol-A and bisphenol-A and 4 parts by weight of antimony oxide. The test pieces are self-extinguishing within 25 seconds after two 10-second ignitions by an open flame, with release of flaming particles that burn only briefly during the test (Rating SE-2, Underwriter's Laboratories Bulletin 94 Flame Test) and the Oxygen Index is 27.0 percent. The tensile strength is 9360 psi. and elongation at break is 30 percent. Notched Izod impact strength is 0.7 ft.-lbs./in. and the Gardner ductile impact strength is 350 in.-lbs.

For comparison purposes, a flame retardant polyester composition is rendered flame retardant with a known halogen-containing agent, the U.L. Bulletin 94 rating being SE-2.

Control Composition A comprises a combination of poly(1,4-butylene terephthalate) and a low molecular weight, chain-stopped, highly brominated tetrabromobisphenol-A - phosgene polymerization product (Procedure C, above) and antimony oxide. The results obtained in flammability and physical testing combined with those of Examples 1–3 are set forth in Table 1:

Table 1

Flammability Data and Physical Properties of Flame Retardant Compositions of Polyesters and Aromatic Polycarbonates

| Example | A* | 1 | 2 | 3 |
|---|---|---|---|---|
| Components (parts by weight) | | | | |
| poly(1,4-butylene terephthalate) | 84 | 65 | 68 | 70 |
| 35:65 aromatic carbonate copolymer of TBBPA and BPA** | — | 30 | 26 | 26 |
| aromatic carbonate homopolymer of TBBPA (5 units) | 13 | — | — | — |
| antimony oxide | 3 | 5 | 6 | 4 |
| Physical Properties | | | | |
| Tensile strength, psi. | 8900 | 8830 | 8640 | 9360 |
| Elongation, ult. % | 99 | 18 | 23 | 30 |
| Notched Izod impact strength, ft.-lbs./in. | 0.5 | 0.7 | 0.7 | 0.7 |
| Gardner impact, in.-lbs. | 35 | 350 | 350 | 350 |
| Flammability Properties | | | | |
| Oxygen Index, % | 26 | 29.0 | 29.5 | 27.0 |
| U.L. Bulletin 94, 1/16" flame bar*** | SE-2 | Se-0 | SE-0 | SE-2 |

*Control
**TBBPA—tetrabromobisphenol-A; BPA-bisphenol-A
***SE-O, self-extinguishes within 5 sec. (avg.), no flaming dripping; SE-2, self-extinguishes within 25 sec. (avg.), but releases flaming drips.

It should be noted that Control A has extremely low ductile impact strength in comparison with the compositions of Examples 1–3. Although the elongations of Examples 1–3 are lower than the control, the Izod impact strength is also significantly higher and, in fact, is equivalent to that of the unmodified normally-flammable polyester. The Gardner ductile impact strengths of the compositions of Examples 1–3 are also very close to those of the unmodified polyester component. Each of the above-mentioned superior physical properties relates to a different form of toughness, i.e., the Izod test measures the ability to resist shock loading whereas the Gardner test measures ductile instead of brittle failure. Thus the compositions of Examples 1–3 provide workpieces which combine flame retardancy with resistance to both brittle and ductile impact failures.

EXAMPLE 4

In a 1 inch Wayne extruder operated at 460°F. are blended 75.5 parts by weight of poly(1,4-butylene terephthalate), intrinsic viscosity 0.92 dl./g., 8.0 parts by weight of an aromatic carbonate homopolymer of bisphenol-A, intrinsic viscosity, 0.52 dl./g., 13.0 parts by weight of an aromatic carbonate homopolymer of tetrabromobisphenol-A, having an average of 5 repeating units (Procedure C), and 3.5 parts by weight of antimony oxide. The blended composition is injection molded in a 3 oz. Van Dorn machine at 485°F. into test pieces which are subjected to physical and flame retardancy measurements. The test pieces are self-extinguishing within 5 seconds after two 10-second ignitions by an open flame with no flaming dripping and a maximum of 10-seconds after-glowing (Rating SE-0, Underwriter's Laboratories Bulletin 94 Flame Test, Modern Plastics, October, 1970, p. 92–98). The Oxygen Index is 28.0 percent (ASTM D-2863). By ASTM D-1708, tensile strength is 8,790 psi. and elongation at break is 120 percent. The Izod impact strength is 0.5 ft.-lbs./in. (ASTM D-256) and the ductile impact strength is 168 in.-lbs. by the Gardner falling dart method, sample ⅛ in. in thickness.

EXAMPLES 5 and 6

The procedure of Example 4 is repeated substituting 73.9 and 71.5 parts by weight of the polyester, 9.9 and 12.0 parts by weight of the aromatic carbonate homopolymer of bisphenol-A, 13.0 parts by weight of the aromatic carbonate homopolymer of tetrabromobisphenol-A (5 repeating units) and 3.4 and 3.5 parts by weight of the antimony oxide.

For comparison purposes, Control Composition B is prepared, omitting the aromatic carbonate homopolymer of bisphenol-A. Control Composition B comprises 83.5 parts by weight of poly(1,4-butylene terephthalate), 13.0 parts by weight of the aromatic carbonate homopolymer of tetrabromobisphenol-A (5 repeating units) and 3.5 parts by weight of antimony oxide.

The results obtained in flammability and physical testing combined with those of Example 1 are set forth in Table 2:

Table 2

Flammability Data and Physical Properties of Flame Retardant Compositions of Polyesters and Aromatic Polycarbonates

| Example | B* | 4 | 5 | 6 |
|---|---|---|---|---|
| Components (parts by weight) | | | | |
| poly(1,4-butylene terephthalate) | 83.5 | 75.5 | 73.9 | 71.5 |
| aromatic carbonate homopolymer of BPA** | — | 8.0 | 9.9 | 12.0 |
| aromatic carbonate homopolymer of TBBPA (5 units) | 13.0 | 13.0 | 13.0 | 13.0 |
| antimony oxide | 3.5 | 3.5 | 3.5 | 3.5 |
| Physical Properties | | | | |
| Tensile strength, psi. | 8760 | 8970 | 9310 | 8850 |
| Elongation, ult. % | 50 | 120 | 107 | 134 |
| Notched Izod impact strength, ft.-lbs./in. | 0.5 | 0.5 | 0.5 | 0.5 |
| Gardner impact, in.-lbs. | 72 | 168 | 216 | 112 |
| Flammability Properties | | | | |
| Oxygen Index, % | 27.0 | 28.0 | 27.0 | 28.0 |
| U.L. Bulletin 94, 1/16 "*** | SE-0 | SE-0 | SE-2 | SE-0 |

*—Control
**—BPA — bisphenol-A; TBBPA — tetrabromobisphenol-A
*** — SE-O, self-extinguishes within 5 sec. (avg.), no flaming dripping; SE-2, self-extinguishes within 25 sec. (avg.), but releases flaming drips.

It should be noted that Control B has lower ductile impact strength in comparison with the compositions of Examples 4–6 and very much lower elongation. Thus these important toughness parameters are not seriously adversely affected in the flame retardant compositions according to this invention.

EXAMPLE 7

In a 2½ inch Prodex extruder operated at 460°F. are blended 74.0 parts by weight of poly(1,4-butylene terephthalate), intrinsic viscosity, 1.10 dl./g., 10 parts by weight of an aromatic carbonate homopolymer of bisphenol-A, 0.62 dl./g., 13.0 parts by weight of an aromatic carbonate homopolymer of tetrabromobisphenol-A, having an average of 5 repeating units (Procedure C), and 3.0 parts by weight of antimony oxide. The blended composition is injection molded in a 3 oz. Van Dorn machine at 490°F. into test pieces which are self-extinguishing within 25 seconds after two 10-second ignitions, and which drip flaming particles (Rating SE-2, Underwriter's Bulletin 94 Flame Test). The Oxygen Index is 27.0 percent (ASTM D-2863). By ASTM D-1708, tensile strength is 9240 psi. and elongation at break is 102 percent. The Izod impact strength is 0.5 (ASTM D-256) and the ductile impact strength is 160 in.-lbs. by the Gardner falling dart method, sample ⅛ in. in thickness.

EXAMPLES 8 and 9

The procedure of Example 7 is repeated, substituting for the aromatic carbonate homopolymer of bisphenol-A, of intrinsic viscosity 0.62, corresponding amounts of the same polymer having intrinsic viscosities, respectively, of 0.52 and 0.45.

For comparison purposes, Control Composition C is prepared, omitting the aromatic carbonate homopolymer of bisphenol-A. Control Composition C comprises 84.0 parts by weight of poly(1,4-butylene terephthalate), 13.0 parts by weight of the aromatic carbonate homopolymer of tetrabromobisphenol-A (5 repeating units) and 3.0 parts by weight of antimony oxide.

The results obtained in flammability and physical testing combined with those of Example 7 are set forth in Table 3:

Table 3

Flammability Data and Physical Properties of Flame Retardant Compositions of Polyesters and Aromatic Polycarbonates.

| Examples | C* | 7 | 8 | 9 |
| --- | --- | --- | --- | --- |
| Components (parts by weight) | | | | |
| poly(1,4-butylene terephthalate) | 84.0 | 74.0 | 74.0 | 74.0 |
| aromatic carbonate homopolymer of BPA | — | 10.0 | 10.0 | 10.0 |
| aromatic carbonate homopolymer of TBBPA (5 units) | 13.0 | 13.0 | 13.0 | 13.0 |
| antimony oxide | 3.0 | 3.0 | 3.0 | 3.0 |
| Physical Properties | | | | |
| Tensile strength, psi. | 8900 | 9240 | 8920 | 9170 |
| Elongation, ult. % | 99 | 102 | 222 | 94 |
| Notched Izod impact strength ft.-lbs./in. | 0.5 | 0.5 | 0.5 | 0.5 |
| Gardner impact, in.-lbs. | 35 | 160 | 320 | 320 |
| Flammability Properties | | | | |
| Oxygen Index, % | 26.0 | 27.0 | 27.0 | 27.5 |
| U.L. Bulletin 94, 1/16" | SE-2 | SE-2 | SE-2 | SE-0 |

*—Control

It should be noted that Control C has very low ductile impact strength (Gardner) in comparison with the compositions of Examples 7–9.

EXAMPLE 10

The procedure of Example 1 is repeated, the composition in this instance comprising 59 parts by weight of poly(1,4-butylene terephthalate), intrinsic viscosity 1.1 dl./g., 10 parts by weight of an aromatic carbonate homopolymer of bisphenol-A, 26 parts by weight of the 35:65 aromatic carbonate copolymer of tetrabromobisphenol-A and bisphenol-A and 5 parts by weight of antimony oxide. The test pieces are self-extinguishing within 5 seconds after two 10-second ignitions by an open flame, with no flaming dripping and a maximum of 10 seconds after-glowing (SE-O). The Oxygen Index is 29.0 percent. The tensile strength is 8,000 psi. and elongation to break is 30 percent. Notched Izod impact strength is 0.7 ft.lbs./in., and the Gardner ductile impact strength is 200 in.-lbs.

For comparison purposes, two compositions are made in which, respectively, the synergist, antimony oxide, and the aromatic carbonate are omitted. The results obtained in flammability and physical testing combined with those of Example 10 and set forth in Table 4:

Table 4

Flammability Data and Physical Properties of Compositions of Polyesters and Aromatic Polycarbonates

| Examples | 10 | D* | E* |
| --- | --- | --- | --- |
| Components (parts by weight) | | | |
| poly(1,4-butylene terephthalate) | 59 | 74 | 95 |
| aromatic carbonate homopolymer of BPA | 10 | — | — |
| 35:65 aromatic carbonate copolymer of TBBA and BPA** | 26 | 26 | — |
| antimony oxide | 5 | — | 5 |
| Physical Properties | | | |
| Tensile strength, psi. | 8000 | 8000 | 8300 |
| Elongation, ult. % | 30 | 35 | 60 |
| Notched Izod impact strength ft.-lbs./in. | 0.7 | 0.6 | 0.5 |
| Gardner impact, in.-lbs. | 200 | 200 | 150 |
| Flammability Properties | | | |
| Oxygen Index, % | 29.0 | 24.0 | 22.5 |
| U.L. Bulletin 94, 1/16" flame bar*** | SE-0 | fails | fails |

*—Control
**—TBBPA — tetrabromobisphenol-A; BPA — bisphenol-A
***—SE-0, self-extinguishes within 5 sec. (avg.), no flaming dripping.

It should be noted that both Controls D and E are not flame retardant to the extent that they meet the stringent requirements of the Bulletin 94 flame test. The notched Izod impact strength of the flame retardant composition of Example 10 is higher than those of the controls and the Gardner ductile impact strength is equal to or higher than the controls. Inspection of the tensile/elongation data reveal that these important properties are retained within commercially acceptable levels if the teachings herein are followed.

In all of the compositions of Examples 4–10, the aromatic carbonate polymer of bisphenol-A has an average number of repeating units of at least 100. With respect to the particular examples, the aromatic carbonate homopolymer about 5 units comprises about 38 percent in Example 4; 43 percent in Example 5; 48 percent in Example 6 and 43 percent in Examples 7–9 of the total weight of the combination with the aromatic carbonate homopolymer having at least 100 units.

Flame retardant compositions according to this invention are provided if the following substitutions are made in the formulations of Examples 1–10.

For the poly(1,4-butylene terephthalate), substitute poly(ethylene terephthalate), intrinsic viscosity 1.0 dl./g.

For the aromatic carbonate copolymer of tetrabromobisphenol-A and bisphenol-A substitute a copolymer of 35 wt. percent tetrachlorobisphenol-A and 65 wt. percent of bisphenol-A units; a copolymer of 35 wt. percent of tetrabromobisphenol-A and 65 wt. percent of propylene glycol units; or a copolymer of 35 wt. percent of tetrabromobisphenol-A units and 65 wt. percent of sebacic acid units.

For the aromatic carbonate homopolymer of tetrabromobisphenol-A having about 5 repeating units, substitute one having, respectively, about 2 and about 10 repeating units; or substitute an aromatic carbonate homopolymer of tetrachlorobisphenol-A having about 5 repeating units.

In the compositions of Examples 1 to 10, substitute for the antimony oxide stoichiometrical amounts of triphenyl antimony or $Sb(OCH_2CH_3)$.

As shown in the Examples, the aromatic carbonate homopolymers and copolymers used in combination with normally flammable polyester resins provide a moldable flame retardant polyesterpolycarbonate composition which lead to molded articles having the excellent toughness of polycarbonates and the outstanding surface properties of the polyesters. It has been demonstrated that polyesters can be rendered adequately flame retardant without sacrificing their outstanding toughness.

The compositions of the invention may also include reinforcing fillers, such as aluminum, iron or nickel, and the like, and non-metals, such as carbon filaments, silicates, such as acicular calcium silicate, asbestos, titanium dioxide, potassium titanate and titanate whiskers, glass flakes and fibers. It is also to be understood that, unless the filler adds to the strength and stiffness of the composition, it is only a filler and not a reinforcing filler, as contemplated herein.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained of the sized filamentous glass reinforcement comprises from about 1 to about 80 percent by weight based on the combined weight of glass and polymers and preferably from about 10 to about 50 percent by weight. Especially preferably the glass will comprise from about 10 to about 40 percent by weight based on the combined weight of glass and resin. Generally, for direct molding use, up to about 60 percent of glass can be present without causing flow problems. However, it is useful also to prepare the compositions containing substantially greater quantities, e.g., up to 70–80 percent by weight of glass. These concentrates can then be custom blended with blends of resins that are not glass reinforced to provide any desired glass content of a lower value.

The length of glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 (⅛ inch).

EXAMPLES 11–18

Using the procedures employed hereinabove, the following compositions were prepared.

| Example | F* | 11 | 12 | 13 | 14 | 15 | 16 | 17 | 18 |
|---|---|---|---|---|---|---|---|---|---|
| Components |  |  |  |  |  |  |  |  |  |
| 1) PBT | 69.8 | 57.81 | 57.1 | 56.50 | 44.18 | 48.10 | 68.84 | 51.8 | 62.3 |
| 1A) Polypropylene |  |  |  |  |  |  |  |  |  |
| 2) 50:50 Aromatic Carbonate copolymer of TBBPA and BPA (IV of 0.35 dl/g. in $CHCl_3$ at 30°C | 0 | 0 | 0 | 0 | 11.02 | 0 | 11.13 | 13.0 | 16.5 |
| 3) Aromatic Carbonate Homopolymer of TBBPA (5 units) | 0 | 8.25 | 9.01 | 9.15 | 11.0 | 8.03 | 0 | 0 | 0 |

—Continued

| Example | F* | 11 | 12 | 13 | 14 | 15 | 16 | 17 | 18 |
|---|---|---|---|---|---|---|---|---|---|
| 4) Glass Fibers (% by wt.) | 30.0 | 30.0 | 30.0 | 30.0 | 30.00 | 40.0 | 15.00 | 30.0 | 15.0 |
| 5) Antimony Oxide | 0 | 2.47 | 2.46 | 2.95 | 2.40 | 2.41 | 3.58 | 5.0 | 6.0 |
| 6) Stabilizers** | 0.2 | 0.20 | 0.20 | 0.2 | 0.2 | 0.16 | 0.2 | 0.2 | 0.2 |
| 7) Cabosil EH-5 (colloidal silica) | 0 | 1.24 | 1.23 | 1.20 | 1.20 | 1.20 | 1.45 | 0 | 0 |
| Physical Properties | | | | | | | | | |
| Tensile Strength, psi | 17,300 | 17,000 | 17,000 | 16,900 | 14,000 | 20,000 | 12,800 | 17,000 | 13,000 |
| Elongation, ultimate % | 5 | 4 | 4 | 4 | 4 | 3 | 5 | 5 | 5 |
| Notched Izod Impact, ft-lb/in. | 2.0 | 1.7 | 1.8 | 1.7 | 1.8 | 2.3 | 1.0 | 1.8 | 1.0 |
| Flammability Properties | | | | | | | | | |
| Oxygen Index, % | 20.5 | 28.5 | 30.0 | 31.0 | 28.0 | 29.0 | 30.0 | 28.5 | 29.0 |
| UL Bulletin 94, 1/16 inch thick bar | FAILS | SE-0 | SE-0 | SE-0 | SE-0 | SE-0 | SE-0 | SE-0 | SE-0 |

*—Control
**—0.%5% Irganox 1093, Ciba Cregy and 0.05 Ferro 904, Ferro Chemical

As a result of the present discovery, there are provided a new family of polyester resin compositions which are particularly useful in molding powder formulations, with other fillers, such as for example, diatomaceous earth, carbon black and the like, to make molded parts of various shapes. They are also useful in preparing gaskets, tubing, and other articles having improved flame resistance.

Films and fibers of the compositions may also be formed in conventional ways, e.g., by drawing at elevated temperatures, such as from 50°C to 200°C. Fibers of the compositions may be used for yarn, thread, bristles, rope and the like.

Although the above examples have shown various modifications of the present invention, other variations are possible in the light of the above teachings. It is therefore to be understood that changes may be made in the particular embodiments of the invention described which are within the full intended scope of the invention as defined by the appended claims.

I claim:

1. A flame retardant thermoplastic composition comprising from 90 to 10 parts by weight of a resinous composition which comprises:
   a. a normally flammable high molecular weight polyester and a flame-retardant amount of from 0.5 to 50 parts by weight per 100 parts by weight of the resinous components of
   b. (i) an aromatic carbonate copolymer in which from 25 to 75 wt. percent of the repeating units comprise chloro- or bromo-substituted dihydric phenol units and the remainder of the repeating units comprise dihydric phenol, glycol or dicarboxylic acid units;
   ii. an aromatic carbonate homopolymer in which the repeating units comprise chloro- or bromo-substituted dihydric phenol units in combination with an aromatic carbonate homopolymer comprising dihydric phenol units; or
   iii. a combination or (i) with an aromatic carbonate homopolymer comprising dihydric phenol units, in combination with
   c. about 0.5 to about 20 parts by weight per 100 parts of combined resinous components in the composition of an inorganic or organic antimony-containing compound; and
   d. from 10 to 90 parts by weight of a reinforcing filler.

2. A flame retardant composition as defined in claim 1 wherein said normally flammable polyester resin is a poly(alkylene terephthalate, isophthalate or mixed isophthalateterephthalate), said alkylene groups containing from 2 to 10 carbon atoms.

3. A flame retardant composition as defined in claim 2 wherein said normally flammable polyester resin is poly(1,4-butylene terephthalate).

4. A flame retardant composition as defined in claim 1 wherein said aromatic carbonate copolymer or homopolymer is a reaction product of phosgene and a dihydric phenol.

5. A flame retardant composition as defined in claim 1 wherein aromatic carbonate copolymer component (b) is one in which from 75 to 25 wt. percent of the repeating units comprise tetrabromobisphenol-A units and from 25 to 75 wt. percent of the repeating units comprise bisphenol-A units.

6. A flame retardant composition as defined in claim 1 wherein said antimony-containing compound is antimony oxide.

7. A flame retardant composition as defined in claim 5 wherein, in said aromatic carbonate copolymer, about 35 wt. percent of the repeating units comprise tetrabromobisphenol-A units and about 65 wt. percent of the repeating units comprise bisphenol-A units, and wherein said copolymer has an intrinsic viscosity of from about 0.2 to about 0.7.

8. A flame retardant thermoplastic composition comprising from 90 to 10 parts by weight of a resinous composition which comprises:
   a. a normally flammable high molecular weight poly(1,4-butylene terephthalate); and from 0.5 to 50 parts by weight per 100 parts by weight of the resinous components
   b. an aromatic carbonate copolymer in which from 25 to 75 wt. percent of the repeating units comprise tetrachlorobisphenol-A or tetrabromobisphenol-A units and from 25 to 75 wt. percent of the repeating units comprise bisphenol-A units, and wherein said copolymer has an intrinsic viscosity of 0.2 to 0.7, in combination with
   c. about 0.5 to about 20 parts by weight per 100 parts of combined resinous components in the composition of an organic or inorganic antimony-containing compound; and
   d. from 10 to 90 parts by weight of a reinforcing filler.

9. A flame retardant thermoplastic composition as defined in claim 8 wherein said component (b) contains repeating units of tetrabromobisphenol-A units and bisphenol-A units and comprises from about 15 to about 50 parts by weight per 100 parts by weight of the total resinous components in said composition.

10. A flame retardant composition as defined in claim 8, wherein said antimony-containing compound is antimony oxide.

11. A flame retardant composition as defined in claim 9 wherein said polyester component (a) comprises from about 50 to about 85 parts by weight; said aromatic carbonate copolymer component (b) comprises from about 15 to about 50 parts by weight; and said antimony compound comprises from about 2 to about 10 parts by weight, all parts being based on 100 parts by weight of the total resinous components in the composition.

12. A flame retardant composition as defined in claim 11 wherein said poly(1,4-butylene terephthalate) component (a) comprises from about 60 to about 80 parts by weight; in said aromatic carbonate copolymer component (b) about 35 wt. percent of the repeating units comprise tetrabromobisphenol-A units and about 65 wt. percent of bisphenol-A units, the amount of component (b) comprises from about 20 to about 40 parts by weight; and the antimony compound comprises antimony oxide, about 3 to 7 parts by weight, all parts being based on 100 parts by weight of the total resinous components in said composition.

13. A flame retardant composition as defined in claim 1 wherein component (b) (ii) comprises in combination an aromatic carbonate homopolymer in which the repeating units comprise units of the formula

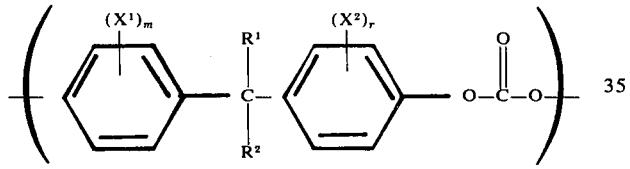

wherein $R^1$ and $R^2$ are hydrogen, (lower)alkyl or phenyl, $X^1$ and $X^2$ are bromo or chloro and m and r are from 1 to 4, the average number of repeating units being from about 2 to about 20 and an aromatic carbonate homopolymer comprising repeating units of the formula

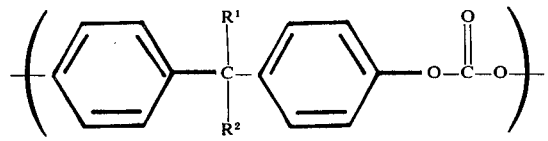

the average number of repeating units being at least 100.

14. A flame retardant composition as defined in claim 13 wherein said antimony-containing compound is antimony oxide.

15. A flame retardant composition as defined in claim 13 wherein the units in the homopolymer of from 2 to 20 repeating units are tetrabromobisphenol-A units and the units in the homopolymer of at least 100 repeating units are bisphenol-A units.

16. A flame retardant composition as defined in claim 13 wherein said aromatic carbonate homopolymer of from about 2 to about 20 repeating units comprises from 30 to 70 wt. percent and said aromatic carbonate homopolymer of at least about 100 repeating units comprises from about 70 to about 30 wt. percent of said combination.

17. A flame retardant thermoplastic composition comprising from 90 to 10 parts by weight of a resinous composition which comprises:
 a. a normally flammable high molecular weight poly(1,4-butylene terephthalate); and from 0.5 to 50 parts by weight per 100 parts of the resinous components of
 b. an aromatic carbonate homopolymer in which the repeating units comprise tetrabromobisphenol-A units, the average number of repeating units being from about 2 to about 20, in combination with an aromatic carbonate homopolymer in which the repeating units comprise bisphenol-A units, the average number of repeating units being at least about 100, in combination with
 c. about 0.5 to about 20 parts by weight per 100 parts of combined resinous components in the composition of an organic or inorganic antimony-containing compound;
 d. from 10 to about 40 percent by weight of a glass filler.

18. A flame retardant composition as defined in claim 17, wherein said poly(1,4-butylene terephthalate) component (a) comprises from about 50 to about 85 parts by weight; said aromatic carbonate homopolymer of from about 2 to about 20 repeating units comprises from about 10 to about 25 parts by weight; said aromatic carbonate homopolymer having at least about 100 repeating units comprises from about 5 to about 25 parts by weight, and said antimony compound is antimony trioxide from about 2 to about 10 parts by weight, all parts being based on 100 parts by weight of the total resinous components in said composition.

19. A flame retardant composition as defined in claim 18 wherein said poly(1,4-butylene terephthalate) component (a) comprises from about 70 to about 85 parts by weight; said aromatic carbonate homopolymer of from about 2 to about 20 repeating units comprises from about 10 to about 15 parts by weight; said aromatic carbonate homopolymer having at least about 100 repeating units comprises from about 5 to about 15 parts by weight and said antimony oxide comprises from about 2 to about 7 parts by weight, all parts being based on 100 parts by weight of the total resinous components in said composition.

20. A flame retardant composition as defined in claim 19 wherein from 35 to 55 wt. percent of said aromatic carbonate homopolymer having from about 2 to about 20 repeating units is combined with from 65 to 45 wt. percent of said aromatic carbonate homopolymer having at least about 100 repeating units.

* * * * *

UNITED STATES PATENT OFFICE
CERTIFICATE OF CORRECTION

PATENT NO. : 3,915,926
DATED : October 28, 1975
INVENTOR(S) : Allen D. Wambach

It is certified that error appears in the above-identified patent and that said Letters Patent are hereby corrected as shown below:

Column 10, line 5, after the word "a" insert --

90 --.

Signed and Sealed this ninth Day of March 1976

[SEAL]

Attest:

RUTH C. MASON
*Attesting Officer*

C. MARSHALL DANN
*Commissioner of Patents and Trademarks*